United States Patent Office 3,459,317
Patented Aug. 5, 1969

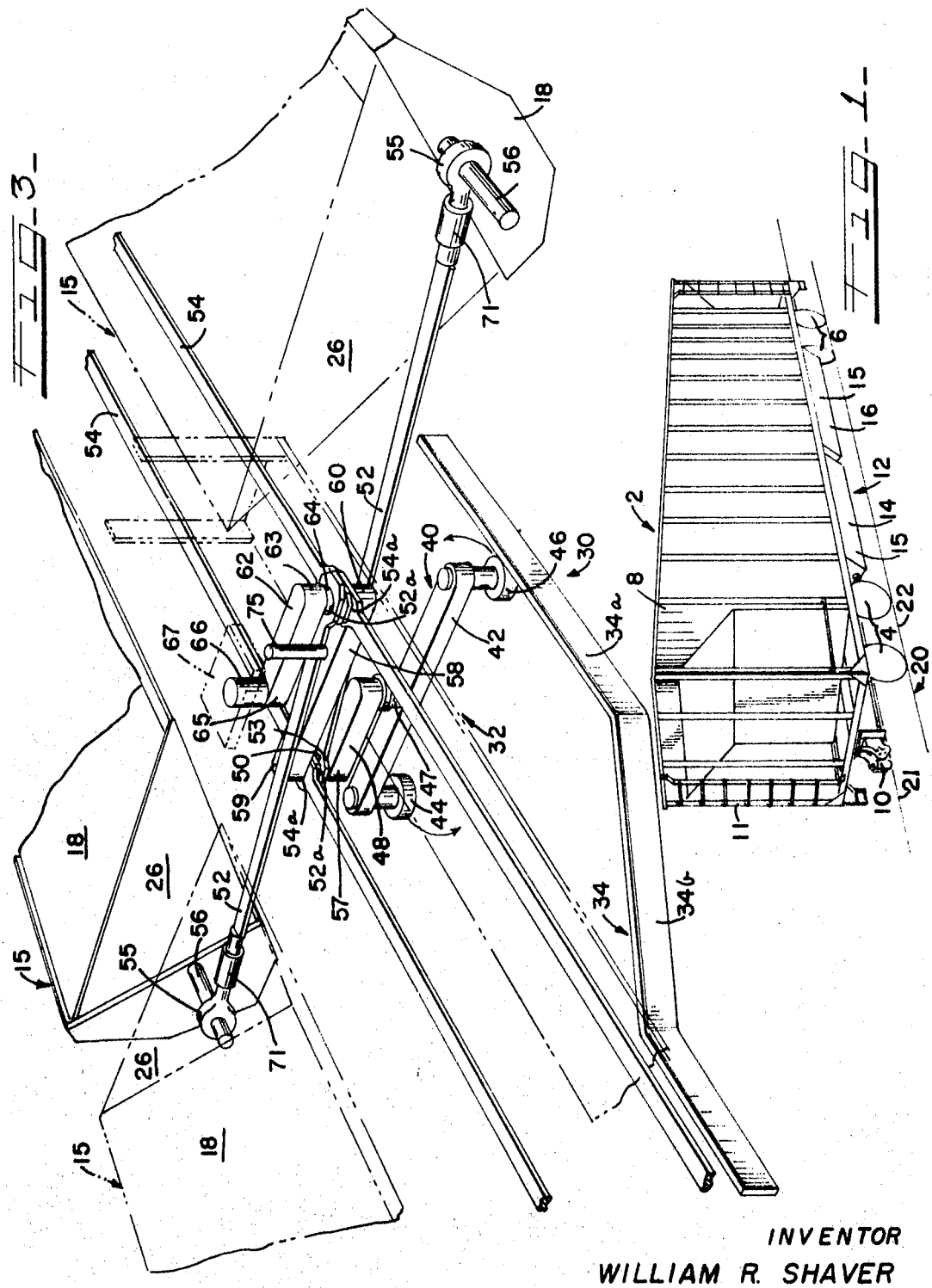

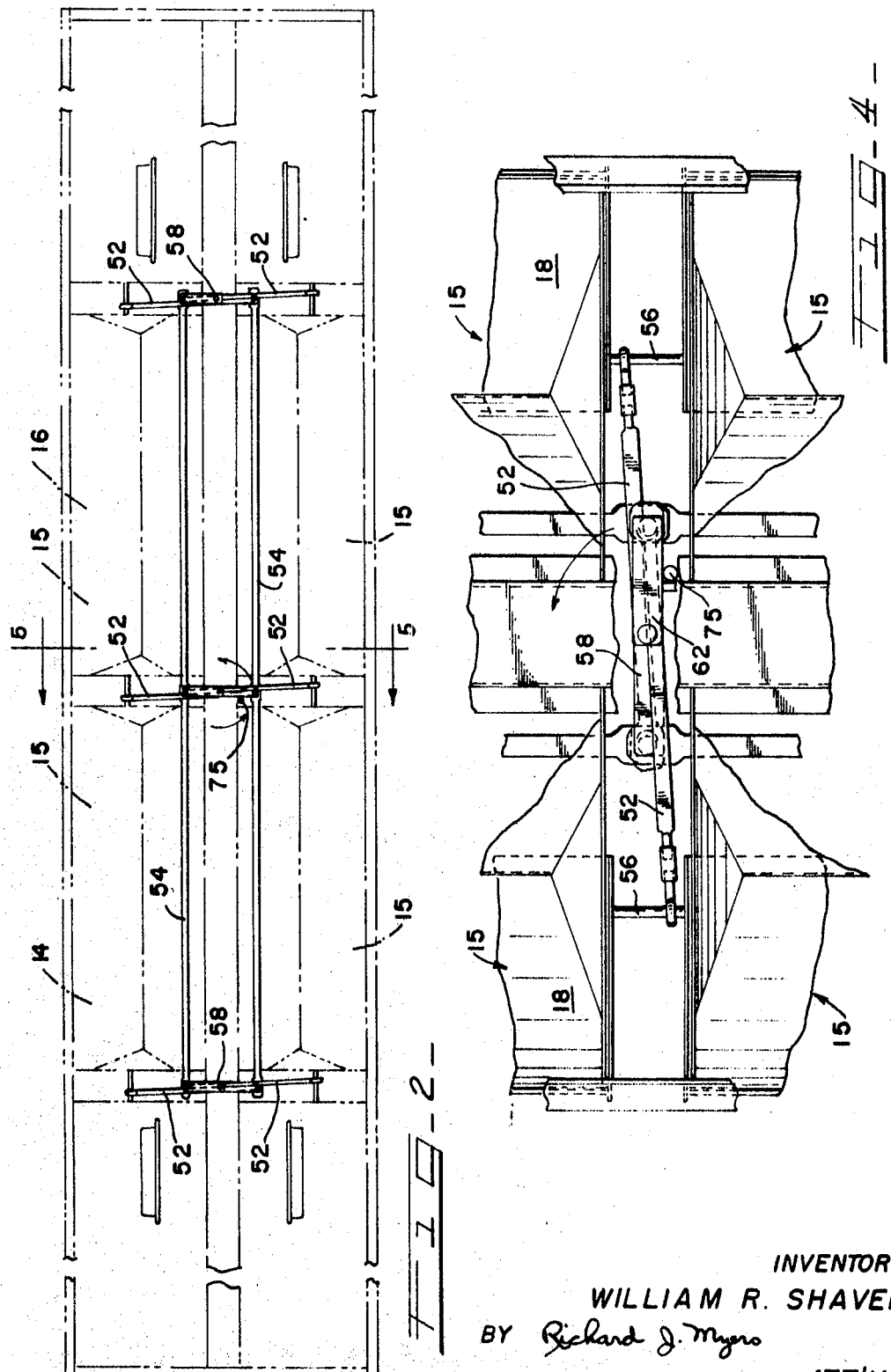

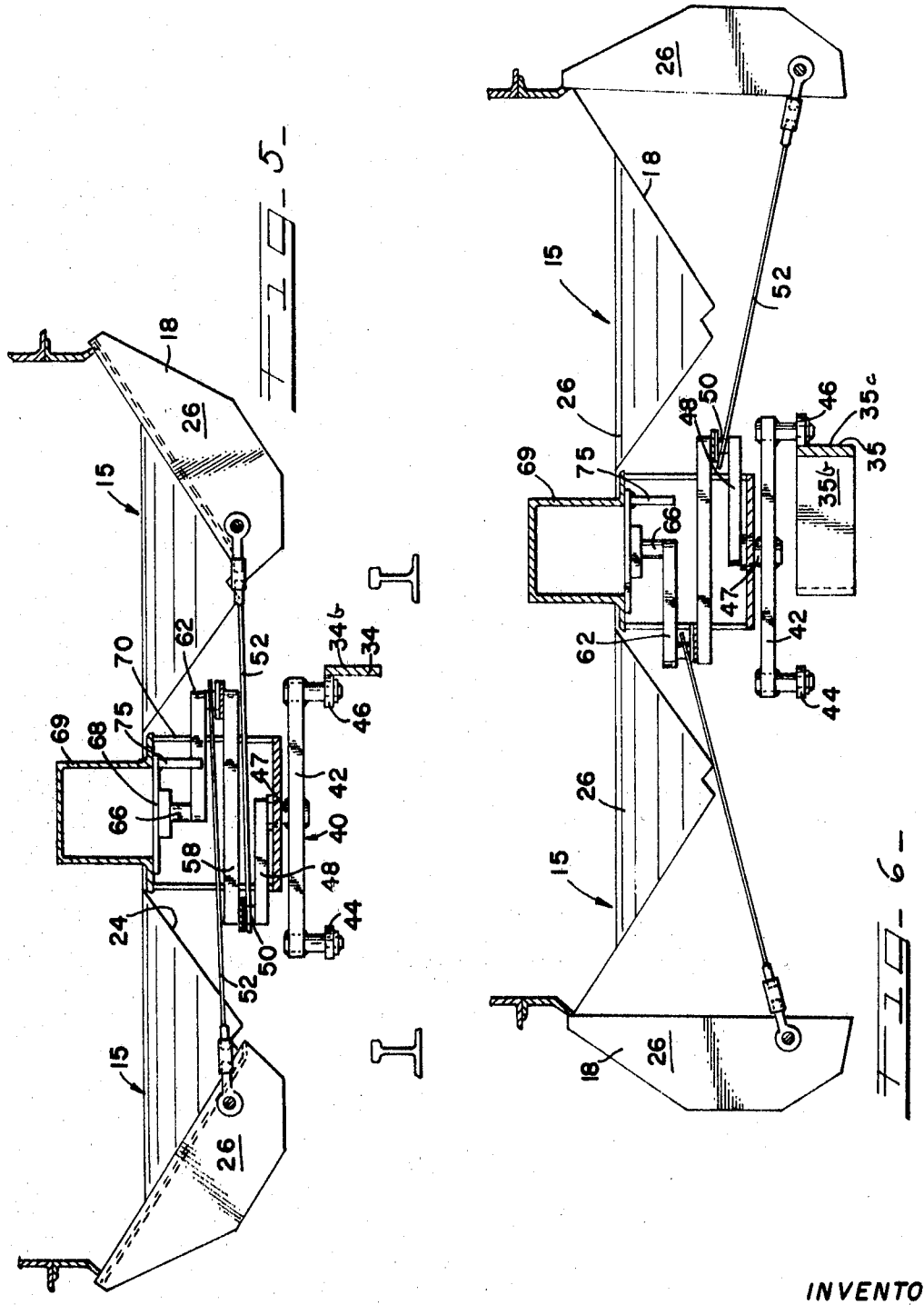

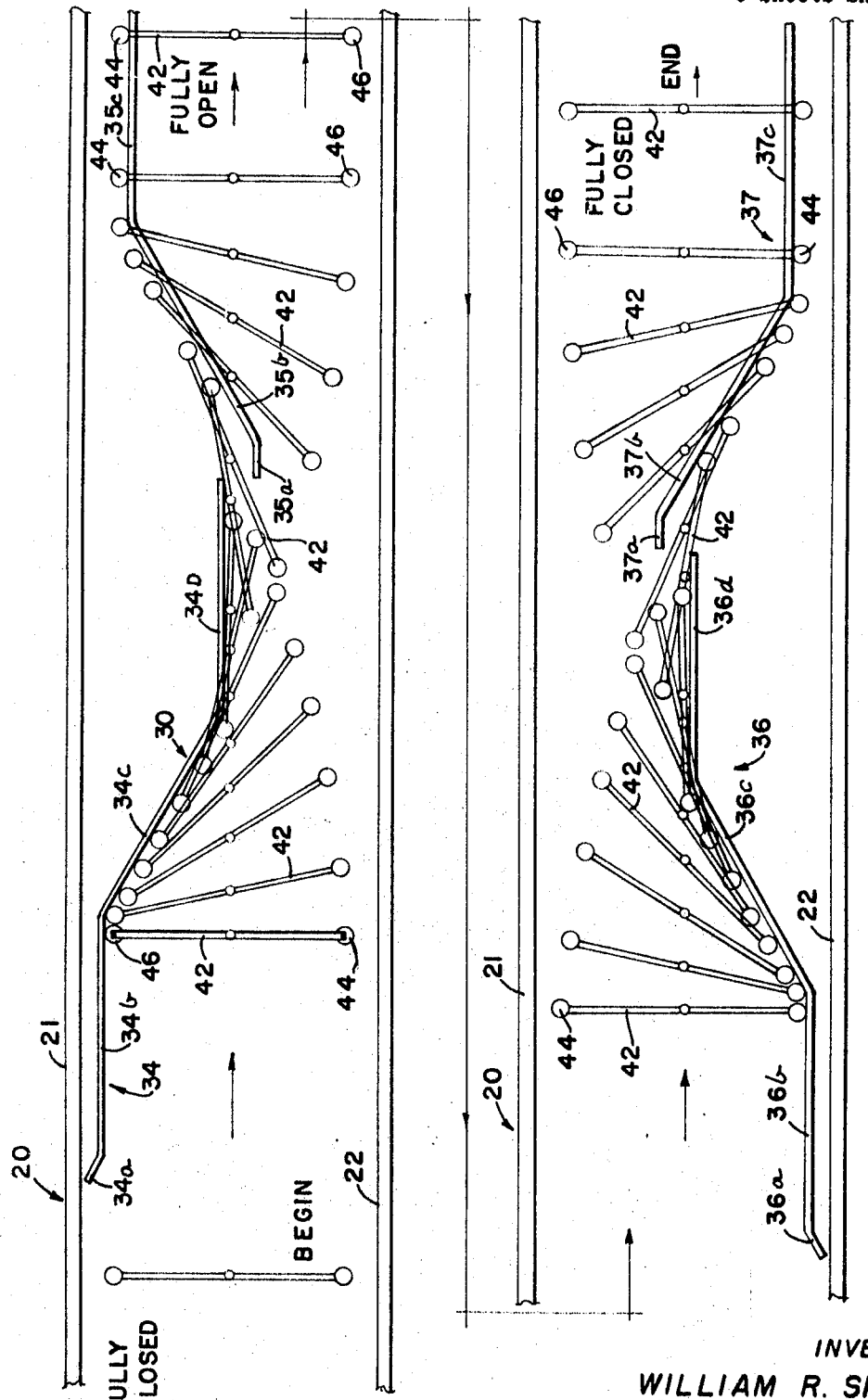

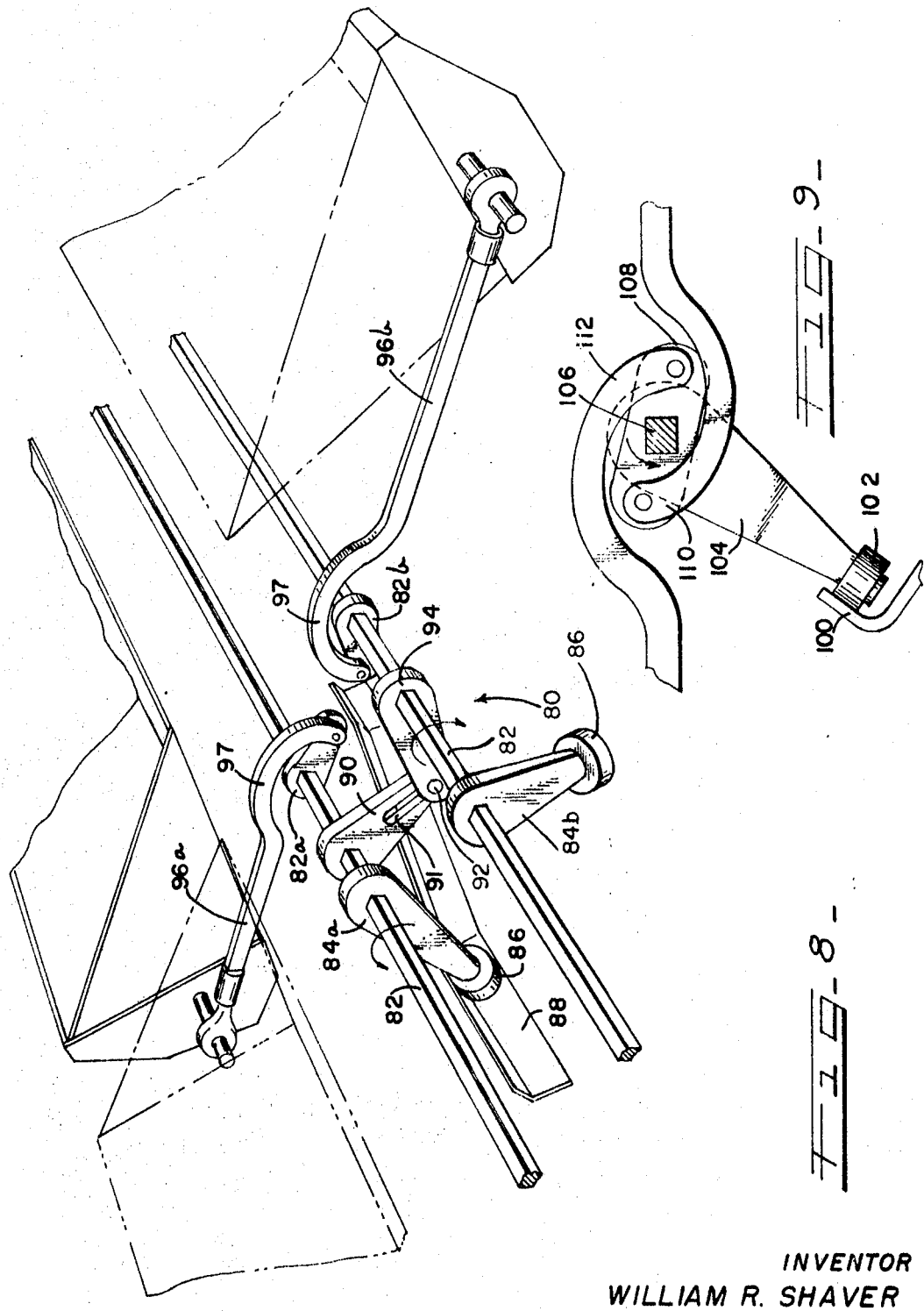

1

3,459,317
OPERATING MECHANISM FOR VEHICLE
DISCHARGE MEANS
William R. Shaver, Munster, Ind., assignor to Pullman
Incorporated, Chicago, Ill., a corporation of Delaware
Filed Dec. 1, 1966, Ser. No. 598,440
Int. Cl. B65g 67/24; B61d 7/00
U.S. Cl. 214—63
24 Claims

ABSTRACT OF THE DISCLOSURE

This invention relates to operating mechanism for vehicle discharge means and, more in particular, relates to mechanism required to open the doors of the side type discharge hopper railroad car whereby the load, such as coal, may be discharged from the side of the railroad car into rail-side below-car lading storage pit as it passes along a certain point of the railroad track over which it traverses.

---

The train hopper car mechanical door mechanism of the invention comprehends an unloading system that is a mechanical device, utilizing linkage powered by an off-track camming device and the train motion. The door operating mechanism has a drive crank or follower arm operating suitable linkage for opening and closing the hopper chute whereby force transfer links acting with the drive crank are operative through transverse parallelogram type movement to simultaneously open or close a pair of opposed hopper chute doors. The engaging lever linkage mechanism on the car is movable in horizontal planes transverse to the longitudinal movement of the car. The lever linkage mechanism contacts a cam track section between the rails as the train car moves over the to-the-side and below-car lading storage pits and automatically opens the hopper car doors, holds the doors open while the coal discharges, and closes the doors after a pre-determined distance. Locking of the mechanism is achieved by a "past-center" linkage and an auxiliary wedge as a safety precaution. The hopper operating mechanism and the cam track will operate no matter which end of the car first enters the dumping area. The cam track section which is located between the rails at the unloading site has right-of-way actuating units for defining the movement of the force transfer links in accordance with the movement of the car along the path of the rail.

DISCLOSURE OF INVENTION

A most efficient and economical method for transporting coal is by way of railroad unitized or integral trains of hopper cars. To reduce the cost of delivering coal, a unitized train depends largely on the number of cars required, and how much time is necessary to unload the cars. Shorter unloading time produces more efficient and economical train operation. Fast discharge of coal while the train is in motion achieves minimum terminal time. Unloading systems where the "over-the-road" locomotive never leaves the train and the regular crew stays with the train, result in much lower cost to the user through elimination of the switch engine and special crews needed to unload cars. The inventive design incorporates features which substantially reduce the operating cost of delivering coal.

It is, therefore, a general object of this invention to provide for an operating mechanism for vehicle discharge means.

Another object of this invention is to provide for a mechanical type unloading system utilizing linkage means powered by off-track engaging device and the motion of the train.

Another object of this invention is to provide for an unloading system having a cam track section located between the train rails and operative for engagement with a lever means or follower arm on the railroad car which contacts the cam track as the car moves past the railroad side pit resulting in automatic opening and closing of the hopper railroad car doors.

Another object of this invention is to provide for a train hopper car mechanical door mechanism which is provided with a "past-center" linkage and an auxiliary wedge means for locking of the mechanical door mechanism as a safety precaution.

It is still a further object of this invention to provide for a door opening mechanism having a drive crank operating suitable linkage for opening and closing the hopper chute door, whereby force transfer links acting with the drive crank are operative through transverse parallelogram type movement to simultaneously open or close a pair of opposed hopper chute doors.

Another object of this invention is to provide for a novel door operating rail or track located between the railroad tracks, the door operating rail means comprising a right-of-way actuating mechanism for defining the movement of the force travel links driving crank or mechanism in accordance with movement along the path of the right-of-way actuating mechanism.

These and other objects will become more apparent from reference to the following description, appended claims and attached drawings wherein:

FIG. 1 is a perspective view of a car provided with a novel door opening mechanism;

FIG. 2 is a plan view of portions of the car employing the novel operating mechanism for the hopper car discharge means;

FIG. 3 is an upright perspective view of the components of the novel operating mechanism for the hopper car discharge operation;

FIG. 4 is a top plan view of the operating mechanism of FIG. 3;

FIG. 5 is an upright view of the hopper door opening mechanism taken along line 5—5 of FIG. 2 with the hopper doors in the closed position;

FIG. 6 is a view similar to FIG. 5 but with the hopper doors not being in the closed position, but in the fully opened position;

FIG. 7 is illustrative of a representation of the right-of-way actuating mechanism including the track and its path for placing the hopper doors in the fully open position and than placing the hopper doors in the fully closed position;

FIG. 8 is a perspective view of a modification of the device, and

FIG. 9 is still another view of a further modification of the device.

With reference now to the drawings and in particular to FIG. 1, there is shown a side discharge hopper car 2 for carrying coal or the like which is provided with the usual trucks 4 and 6 which carry the bar body 8 provided with coupling means 10 and a ladder 11 and the underneath discharge hopper means 12 which comprise a pair of similar hopper units 14 and 16. As seen more clearly in the top plan view of FIG. 2, each hopper unit 14 or 16 comprises a pair of laterally spaced V-shaped hopper chutes 15, 15. Each hopper 15 (see FIGS. 3, 4, 5 and 6) is V-shaped in cross section and is of the side discharge type in that it is provided with a longitudinally extending laterally disposed underside sloping hopper door 18 which in the open position, as for instance shown in FIG. 6, is to permit any lading, such as coal, to be discharged laterally of or out of the side of the car and somewhat outwardly of the rail track over which the car traverses, for instance outwardly of the track 20 as schematically indicated in FIG. 1 and also as shown in FIG. 7, the track 20 consisting of two parallel rails 21 and 22 respectively. Each hopper 15 in addition to having a movable laterally outwardly opening door 18 has an inward longitudinally extending side 24 to form with the door 18 the V-shaped hopper unit 15, having the usual end walls 26.

As the coal car traverses along the track 20 it encounters door actuating mechanism in the form of right-of-way structure positioned between the rails 21 and 22, generally indicated as right-of-way or door tripping mechanism 30, as shown in FIG. 7, which mechanism 30 in turn operates the door operating or actuating lever linkage mechanism 32 located on the car itself as distinguished from the mechanism or cam track section 30 which is located on the railroad bed. When engagement occurs between the structures 30 and 32 during car movement, the door structure 18 is caused to be opened and later to be closed. The actuating device or right-of-way structure 30 for the doors comprises a pair of track or guide sections 34 and 36 spaced longitudinally of one another on the track bed, the right-of-way element 34 comprising a small initiating portion 34a which is at a slight inward sloping angle to the railroad rail elements 21 and 22. The next part of the right-of-way element 34 consists of an elongated track or guide portion 34b which is parallel to the railroad track elements 21 and 22 and a right-of-way element portion 34c connects with the portion 34b between the track elements 21 and 22 and is at an angle thereto and extends toward the element 22. The next right-of-way portion 34d, connecting with part 34c, is parallel to the track elements 21 and 22. The right-of-way element 35 which immediately follows the element 34, and separated therefrom, comprises an initial portion 35a which begins where element portion 34d left off and is spaced laterally from and slightly from it toward the track element 22. The right-of-way element 35 has for its next portion a diagonal portion 35b that extends toward the outside track element 21; and the last right-of-way portion 35c is parallel to the track element 21. These right-of-way elements 34 and 35 operate the door as will be later explained. Immediately following the right-of-way elements 34 and 35 are the hopper closing right-of-way elements 36 and 37. The right-of-way element 36 is between the track elements 21 and 22 and is a mirror image (or inverse) of element 34 having an initiating closing section or portion 36a diagonal to and extending away from track 22 followed by an elongated section 36b that is parallel to the track elements 21 and 22, followed by a diagonal portion 36c extending toward the track element 21, followed by the last right-of-way element portion 36d which is parallel to track elements 21 and 22. Immediately following this element 36 is the element 37 (a mirror image or the inverse of element 35) which has a portion 37a parallel to track elements 21 and 22 and away therefrom toward rail 21, followed by a portion 37b which diagonally extends toward track 22 followed by a last portion 37c that is parallel to both track elements 21 and 22. As mentioned, the track elements 36 and 37 provide for moving of the door from the fully opened position as shown in FIG. 6 to the fully closed position as shown in FIG. 5, the operation of which will be explained later.

The mechanical door operating mechanism 32 that is actuated by actuating mechanism or right-of-way structure 30, as seen in FIGS. 2 through 6, comprises a force-actuating bar or drive lever means 40 which has an elongated follower arm 42 which carries at its ends roller means 44 and 46, the roller means 46 engaging the inside of the right-of-way element portion 34b of the element 34 (FIG. 5) or the roller means 44 engaging the outside of element portion 35b of element 35 (FIG. 6) while the roller means 44 or 46 is out of contact with any other right-of-way elements. The central portion of the lever 42 fixedly carries on its upper side an upwardly projecting stub shaft or arm 47 which is fixedly coupled to one end of a transversely extending upwardly disposed throw arm 48 which has at its outer lateral end an upwardly extending pin 50 which pivotally connects with the door opening rod 52 by enlarged loose fitting rod aperture 52a for opening the hopper 18 on the right side of the hopper car. Above this the pin 50 also extends through enlarged loose fitting aperture 54a of the force transfer link 54. The apertures 52a and 54a have such sufficiently loose fit with respect to the pin 50 as to allow them to be freely pivoted with respect to the pin and in particular the force travel link 52 is not only permitted fore and aft and transverse motion but is also permitted to have vertical motion for swinging open the door 18. The other end 55 of the link 52 is pivotally attached to a pin 56 attached to the door 18 for opening the door. An intermediate motion transmitting arm 58 is connected to the pin 50 at its end 59 and at its other end 60 has a pin connecting the interconnecting arm 58 with the crank arm or throw arm 62 at the end 63 of the arm 62, the connection being made by the vertically extending pin 64 which receives the other door operating rod 52 having an end 55 connected to a pin 56 for opening the other laterally opposed door 18 on the left side of the car. The last mentioned rod 52 is suitably enlargedly apertured at 52a and below the door opening rod 52 is disposed the other longitudinally descending force transfer link 54 which is suitably enlargedly apertured at 54a. The crank arm 62 at its end 65 has an upwardly extending shaft 66 freely journaled in journal block 67 in the underside member 68 attached to the center sill structure 69 of the hopper car. A support structure 70 suspendingly carries and provides a bearing arrangement for the members 47 and 65 of the lever system. Thus it is seen that the crank arms 48 and 62 are interconnected with one another by the link 58, the link 58 being so connected to each crank arm 48 or 62 that the force activating follower bar or drive lever 42, the crank arms 48 and 62 and the crank lever 58 at all times have their longitudinal extents lying in a common vertical plane as they are rotated by engagement of the rollers 44, 46 with the camming rail means 34, 35, 36, 37. As the cranking structure which consists of elements 62, 58 and 48 rotate about their pivot 66, the left force transfer link 54 moves to the right to take the position held by the right force transfer link 54 and the right transfer link 54 simultaneously moves to take the place of the left transfer link 54 with concurrent pulling on the respective door opening rods 52, 52 to open the respective laterally disposed hopper doors 18, 18. A 180 degree rotation of the follower bar 42 is required to move the respective force transfer links 54, 54 to take each other's position moving the doors from fully closed position as shown in FIG. 5 to the fully opened position as shown in FIG. 6 to the fully closed position again. Either end of the car can enter the right-of-way track elements for dumping of the lading. It will be noted that when referring to FIG. 7 the track right-of-way element portions that are parallel to the rails 21 and 22 do not affect the action of the force actuating bar or drive lever but that the camming portion of the right-of-way elements 34, 35, 36 or 37 cause movement of the transfer or force transfer links in a transverse direction. In reviewing FIG. 7 it is seen that as the drive lever roller 46 engages right-of-way element 34b the drive lever 42 position remains unaffected but as the lever roller 46 engages the right-of-way element 34c it is caused to rotate about the pin 46 in a direction with its lower end roller 44 moving toward the right-of-way structure 34; whereupon continued movement of the car in the direction of the arrow causes the drive lever 42 to move in a position parallel to the train tracks 21 and 22 in which position the hopper doors are half-open and as the car continues forward the other roller 44 engages the outside of the right-of-way track 35 and causes the drive lever 42 to rotate another 90 degrees to a position wehre it was 180 degrees rotated from its initial position and at this point the hopper doors are fully opened. As the car continues in the direction of the arrows it is seen that the drive lever roller 46 engages the inside of right-of-way structure 36 to cause rotation of the drive lever 42 in a clockwise direction as the roller 46 engages the inside of the track 36c causing the hopper doors to start to move to the closed position and when at the right-of-way element portion 36d the doors are partially closed and then the roller 44 engages the outside of the portion 37b to cause the drive lever 42 to rotate another 90 degrees to its original position where the hopper door is in the fully closed position.

With reference to FIG. 2 it is noted that the force transfer links positioned to be coupled to the longitudinally intermediate door opening rods 52, 52 similarly connected to fore and aft cross transfer members 58 and door opening rods 52, 52 for opening additional fore and aft hopper car doors. In this respect it will be appreciated that the follower bar 42 could be placed in the center of the car as shown in FIG. 2 or at some other point along the car, say, at the point where the rearwardly disposed door opening rods are located or at a point where the forwardly disposed door opening rods are located. Each door opening rod 52 is provided with a turn buckle or adjusting threaded collar 71 (see FIG. 3) to decrease or increase the over-all length of a respective door opening rod 52 for adjusting the degree or amount of opening or closing of the hopper door. Similar type of adjustable means for extending or decreasing the length of the force transfer links may be provided for determining the amount of degree of opening of the hopper doors. The adjustable means 71 in the door opening rods 52 take up tolerances and insure a tight closing of the door. The enlarged holes 54a, 52a in the force transfer links 54 and the door opening rods 52 at their connection with the crank portions are oversized to allow for transverse and longitudinal movement as well as vertical motion. The actuating rail pick-up wheel 44 or 46 contacts actuating rail members at the lading dumping pit along the side of the rail.

It is to be noted that in FIG. 4 and in FIG. 2 there is provided within the housing 70 an over-center stop 75 and this is also shown in FIGS. 5 and 6. This over-center stop prevents accidental opening of the doors when the doors are in the closed position because if the doors try to open, the crank arm 62 is pulled against the over-center pin 75 to prevent any further opening of the door, as shown in FIG. 4. This arrangement of the over-center pin operates in either direction the train is running. In the open position of the door, the door is kept open by the door operating rods 52, 52.

It is thus seen that there is provided a novel side discharge hopper door for a railroad car, said novel door operating mechanism including a drive crank assembly connected with force transmitting linkage for operating door opening rods, whereby the drive crank is driven by a drive lever having driving engagement with a right-of-way mechanism in the form of an actuating rail structure.

A modification of the door operating mechanism and right-of-way actuating track or rail therefor is shown in perspective in FIG. 8 where there is provided a door operating mechanism 80 for operating the doors 18, 18 of the car. The door operating mechanism comprises the parallel force-transmitting members 82, 82 which are constrained for rotation with the drive levers 84a, 84b having rollers 86, 86 engaging the right-of-way track or rail means 88 (which is similar to FIG. 7 but at a more acute angle in cross section) whereby the drive lever 84a is swung to the right, rotating the force-transmitting member in a counterclockwise direction which similarly rotates slotted coupling arm 90 having a slot 91 coupling with a pin 92 in pin carrying arm 94. The arm 94 is caused to rotate clockwise by the arm 90 which in turn causes the other force-transmitting member 82 to rotate in a clockwise direction whereby throw arms 82a and 82b are caused to rotate by rotation of their respective force-transmitting members 82, 82 to cause their respective door opening rods 96a, 96b to open the doors 18, 18. It is to be noted that each of the door opening rods or links 96a or 96b have a U-shaped arm portion 97 to provide sufficient angular movement of the rods 96a or 96b in order to open the hopper doors 18, 18. The links 96a or 96b may be attached to each side or to the center of each door. This arrangement permits operating of both of the force-transmitting members or shafts together. The drive lever 84b permits the opposite end of the car to operate should the car be turned about. The actuating track 88, of course, is located as in the first disclosed embodiment at the unloading site.

A further modification is shown in FIG. 9 where there is shown the right-of-way track 100 engaging the roller 102 of the drive lever 104 to rotate shaft or force-transmitting member 106 in a counter-clockwise direction to rotate the crank arm 108, the outer ends of which carry respective door operating rods 110, 112 for opening the doors 18, 18. The drive lever or lock-actuating arm rotates about the operating shaft or force-transmitting member 106 to rotate the crank arm 108 thereabout in order to swing the looped or bight formed ends 112 of each of the door operating rods 110, 112, say, from ninety degrees to, say, one hundred degrees swing of the drive lever or lock-actuating arm 104. As usual, the actuating track 100 is located at the unloading site. The track 100 is curved to open the doors, hold the doors open during loading, and lock the doors after unloading. Thus, it is seen that the first mentioned embodiment provides that the drive lever and its associated crank mechanism rotates about a vertical axis and its associated force transfer members move transversely in a horizontal plane whereas in the second and third embodiments, aforementioned, the drive lever swings about a horizontal axis in a vertical plane and the force transfer members or member rotate or rotates about horizontal longitudinal axes or axis. In all three instances, however, the door operating rods, of course, move vertically in a vertical plane transverse to the longitudinal axis of the car. It is thus seen that there is provided drive lever means extending below the vehicle tracks and couplable through force-transmitting means with door opening or operating rods that move in transverse vertical planes wherein there is a throw arm or crank arm connection between the drive lever and the force-transmitting member or means.

The foregoing description and drawings are given merely to explain and illustrate the invention, and the invention is not to be limited thereto, since those skilled in the art who have the disclosure before them will be able to make modifications and variations therein without departing from the scope of the invention.

What is claimed is:

1. Door operating mechanism for a vehicle discharge means having doors for discharging a load from the vehicle, comprising:
   a door operating crank mechanism having generally horizontally extending vertically spaced throw portions and disposed on the vehicle, actuating rail engaging mechanism comprising force actuating means in the form of a drive lever having an operative connection with the throw portion of the crank mechanism, a pair of force transfer members disposed in opposed relation to one another and having operative connection with the respective throw portions of the crank mechanism, and a door operating means for connecting the doors with the force transfer members, said throw portions of said crank mechanism comprising a first lower throw arm being connected with said drive lever, and a second upwardly disposed throw arm being adapted to be mounted for rotation on said vehicle, and means interconnecting the force transfer members and the throw arms with one another, the end of the first throw arm being connected with one laterally disposed force transfer member and the end of the second throw arm being connected with the other force transfer member for allowing each of said force transfer members to move toward one another and away from one another upon angular sweeping movement of the throw arms.

2. The invention according to claim 1, and said door operating mechanism having an over-center stop placed in motion restricting relation to said crank mechanism for limiting the angular sweep of the latter when the throw portions are over-center with respect to the door operating means attendant to holding the doors in a closed position.

3. The invention according to claim 1, and right-of-way actuating rail means comprising a first door opening rail for engagement with the drive lever to partially open the door, and a second door opening meandering rail longitudinally from said first named rail for fully opening said door, and a first door closing actuating rail having a meandering path for operative engagement with the drive lever for partially closing said door, and a second door closing rail having a meandering path and operatively engaged with the drive lever for completely closing said door and being in longitudinal alignment following said first door closing rail.

4. Door operating mechanism for a vehicle discharge means having doors for discharging a load from the vehicle, comprising:

a door operating crank mechanism having generally horizontal swinging vertically spaced throw portions and disposed on the vehicle, actuating rail engaging mechanism comprising force actuating means in the form of a drive lever having an operative connection with connection with the one throw portion crank mechanism, the other throw arm portion being adapted to be connected to the vehicle, a pair of interconnected generally horizontally extending force transfer members disposed in laterally opposed relation to one another and having operative connection with the respective throw portions of the crank mechanism for generally horizontal movement of the members toward and away from one another, and door operating means for transversely connecting the doors with the force transfer members, and right-of-way actuating rail means being disposed beneath the vehicle for applying a rotary motion to the drive lever as the vehicle moves over the discharging area whereby the throw portions of the crank mechanism in their angular sweep impart transverse motion to the door opening rods for opening and closing of the doors of the vehicle.

5. An arrangement for opening and closing lading discharge doors on a railway vehicle as said railway vehicle traverses the trackway, said arrangement including generally vertically extending door operating shaft means vertically supported from said railway vehicle for rotary movement about its own axis, drive means connected to said shaft means and driven thereby during rotation thereof to open and close the lading discharge doors, a cam follower fixed to said operating shaft means and disposed in a horizontal plane, and cam means mounted on said trackway and including cam surface means disposed in generally a vertical plane and engageable with said cam follower to angularly displace the latter as said railway vehicle traverses said trackway thereby to rotate said shaft means about the vertical axis thereof and operate said driven means.

6. A camming arrangement for actuating a door operating mechanism of a railway vehicle during travel of said railway vehicle along a trackway and wherein said door operating mechanism includes a horizontal follower arm supported intermediate the ends thereof for rotation about a vertical axis and disposed substantially transversely to the trackway when said vehicle doors are in the closed and open positions, said camming arrangement comprising a first camming section located on said trackway and engageable with one end of said transversely extending follower arm to cause the latter to be rotated whereby said door operating mechanism is actuated to open said doors, and a second camming section located on said track spaced lengthwise and transversely from said first camming section and engageable with said one end of said follower arm to rotate the latter in the opposite direction whereby said door operating mechanism is actuated to close said doors.

7. Door operating mechanism for a vehicle discharge means having a movable door for discharging a load from the vehicle, comprising:

a door operating crank mechanism having generally horizontally extending vertically spaced upper and lower throw arms and an intermediate generally horizontally extending link intermediately spaced between and connected to each arm, the upper arm being adapted to be connected to the vehicle, force actuating means including a drive means having an operative connection with the throw arms for rotation of the crank mechanism about a vertical axis, force transfer means having a portion thereof connecting with each throw arm, and door opening rod means connecting with said force transfer means for allowing reciprocative movement of the force transfer means in general horizontal plane upon angular sweeping of the throw arms.

8. A vehicle having compartment means provided with discharge opening doors for discharging a load from the vehicle compartment means, comprising:

a door operating crank mechanism having generally horizontally extending vertically spaced first upper and second lower throw arms, the first arm connecting with said vehicle, force actuating means including a drive means having an operative connection with the throw arms, a pair of elongated force transfer members disposed in laterally opposed relation to one another, intermediate means between the first and second throw arms interconnecting the arms and the force transfer members with one another, the end of the first throw arm being connected with one force transfer member and the end of the second throw arm being connected with the other force transfer member and allowing each of the force transfer members to move toward and away from one another on generally horizontal plane upon angular movement of the throw arms, and door opening rod means connecting with said pair of force transfer members and with the vehicle doors for opening of said doors.

9. The invention according to claim 7 and said drive means including a lever being rotatable about a generally vertical axis and said force transfer means being elongated in a direction transverse to said crank mechanism and being movable thereby in a generally horizontal plane.

10. The invention according to claim 8, and
first pivot means pivotally connecting said first throw arm and said first transfer member with one end of said interconnecting means and a second pivot means connecting said second throw arm and said second transfer member with the other end of said interconnecting means.

11. The invention according to claim 10, and
each of said door operating members being connected with said first pivot means.

12. The invention according to claim 8, and
each of said transfer members being generally parallel to one another and to form with the interconnecting means a parallelogram-type structure which contracts to open the doors and expands to close the doors.

13. The invention according to claim 12, and
one of said transfer members being spaced vertically with respect to the other transfer member to allow one transfer member to pass over the other member in a parallel plane.

14. The invention according to claim 8, and
said drive means including a lever comprising a depending shaft extending from the second throw arm and having at its lower end thereof a pivotally mounted link rotatable thereabout and carrying rail engaging members adapted to engage associated rail means attendant to rotation of the crank mechanism and reciprocation of the transfer members.

15. The invention according to claim 14, and
ground mounted rail means adapted to engage with one end of the drive lever link.

16. The invention according to claim 15, and
said rail means comprising longitudinally spaced apart rails adapted to engage the drive lever link attendant to opening and closing of the vehicle doors respectively.

17. The invention according to claim 8, and
a trackway for said railway vehicle, said drive lever including door operating shaft means vertically extending on said railway vehicle for rotary movement about its own axis, said crank mechanism being connected to said shaft means and driven thereby during rotation thereof to open and close the lading discharge doors, a cam follower fixed to said operating shaft means and disposed in a horizontal plane, and cam means mounted on said trackway and including cam surface means disposed in a generally vertical plane and engageable with said cam follower to angularly displace the latter as said railway vehicle traverses said trackway thereby to rotate said shaft means about the vertical axis thereof and operate said driven means.

18. The invention according to claim 16, and
a camming arrangement for actuating a door operating mechanism of a railway vehicle during travel of said railway vehicle along a trackway and wherein said drive lever includes a horizontal follower arm supported intermediate the ends thereof for rotation about a vertical axis and disposed substantially transversely to the trackway when said vehicle doors are in the closed and open positions,
said camming arrangement comprising a first camming section located on said trackway and engageable with one end of said transversely extending follower arm to cause the latter to be rotated whereby said door operating mechanism is actuated to open said doors, and a second camming section located on said track spaced lengthwise and transversely from said first camming section and engageable with said one end of said follower arm to rotate the latter in the opposite direction whereby said door operating mechanism is actuated to close said doors.

19. Door operating mechanism for a vehicle discharge means having doors for discharging a load from the vehicle comprising:
a door operating crank having throw means and disposed on the vehicle,
actuating rail engaging mechanism comprising a depending drive lever means rotatable about a generally vertical axis and operatively connected with the throw means for imparting rotational movement to the throw means,
force transfer means connecting with said throw means for movement of the force transfer means, and
door operating means connecting with said force transfer means for movement of the door operating means pursuant to opening of the doors.

20. The invention according to claim 19, and
said crank throw means comprising vertically spaced throw portions,
said force transfer means having a pair of force transfer members disposed in opposed relation to one another and having operative connection with the respective throw portions.

21. The invention according to claim 20, and
said throw portions of said crank mechanism comprising a first lower throw arm being connected with said drive lever, and
a second upwardly disposed throw arm being adapted to be mounted for rotation on said vehicle, and
intermediate means spaced vertically between the throw arms and interconnecting the force transfer members and the throw arms with one another,
the end of the first throw arm being connected with one laterally disposed force transfer member and the end of the second throw arm being connected with the other force transfer member for allowing each of said force transfer members to move toward one another and away from one another upon angular sweeping movement of the throw arms.

22. The invention according to claim 20, and
said door operating means including a pair of laterally opposed door operating members each being pivotally connected to a respective transfer member and extending outwardly and transversely thereof and connecting with a respective door, each inward end of each door operating member extending inwardly and passing the other to provide maximum movement of each door as one longitudinally extending transfer link moves past the other in rotary operation of the drive lever.

23. A door operating mechanism for a vehicle discharge means having doors for discharging a load from the vehicle comprising:
a door operating crank mechanism having generally horizontally extending vertically spaced upper and lower crank arms, the upper crank arm being attached to the vehicle for rotation about a vertical axis,
drive means being operatively connected with each of the crank arms for rotation thereof about a vertical axis,
an intermediate link connected with each of the crank arms,
a pair of elongated force transfer links extending transversely of the crank mechanism, each transfer link being pivotally connected with a respective crank arm and with a respective end of the intermediate link,
door operating rods extending from a respective transfer link and connecting therewith and with a door of the vehicle.

24. The invention according to claim 23, and
said drive means comprising a drive lever connecting with and extending below the lower crank arm and adapted for engagement with an off-vehicle rail for rotation of the crank mechanism about a vertical axis.

References Cited
UNITED STATES PATENTS

| | | | |
|---|---|---|---|
| 746,519 | 12/1903 | Johnson | 105—251 |
| 789,155 | 5/1905 | Kiesel | 105—255 |
| 789,392 | 5/1905 | Summers | 105—255 |
| 1,092,659 | 4/1914 | Mettler. | |
| 1,266,630 | 5/1918 | Ross et al. | 214—63 |
| 3,314,558 | 4/1967 | Dorey | 105—290 X |

ROBERT G. SHERIDAN, Primary Examiner

U.S. Cl. X.R.

105—290, 296, 299, 304